May 19, 1942. W. ERNST ET AL 2,283,168
HIGH SPEED PRESS CONTROL
Filed Sept. 19, 1940 6 Sheets-Sheet 1
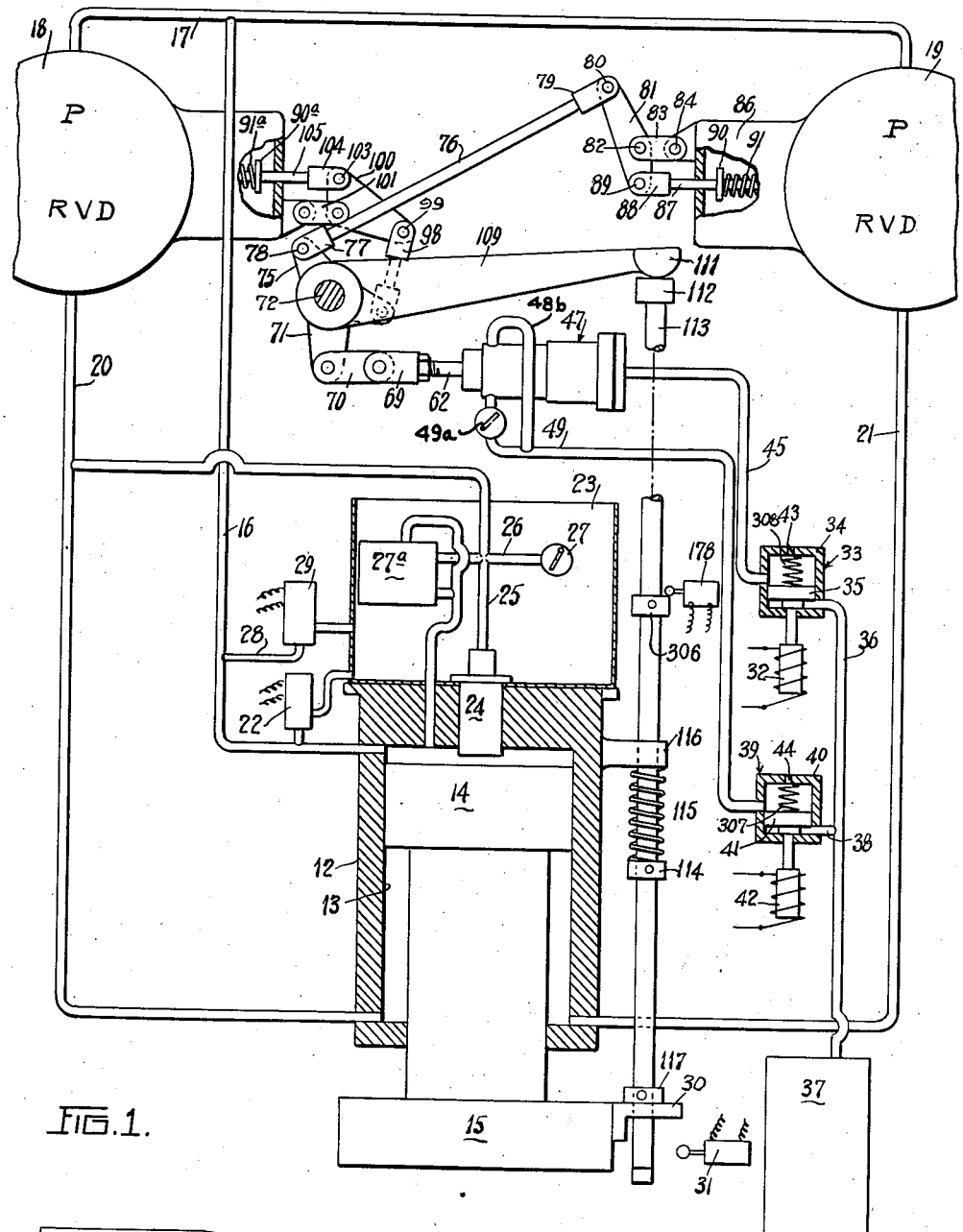
FIG. 1.
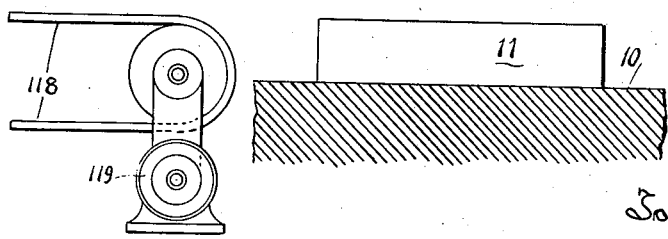
Inventors
WALTER ERNST,
PHILIP J. LINDNER,
BY Toulmin & Toulmin
Attorneys

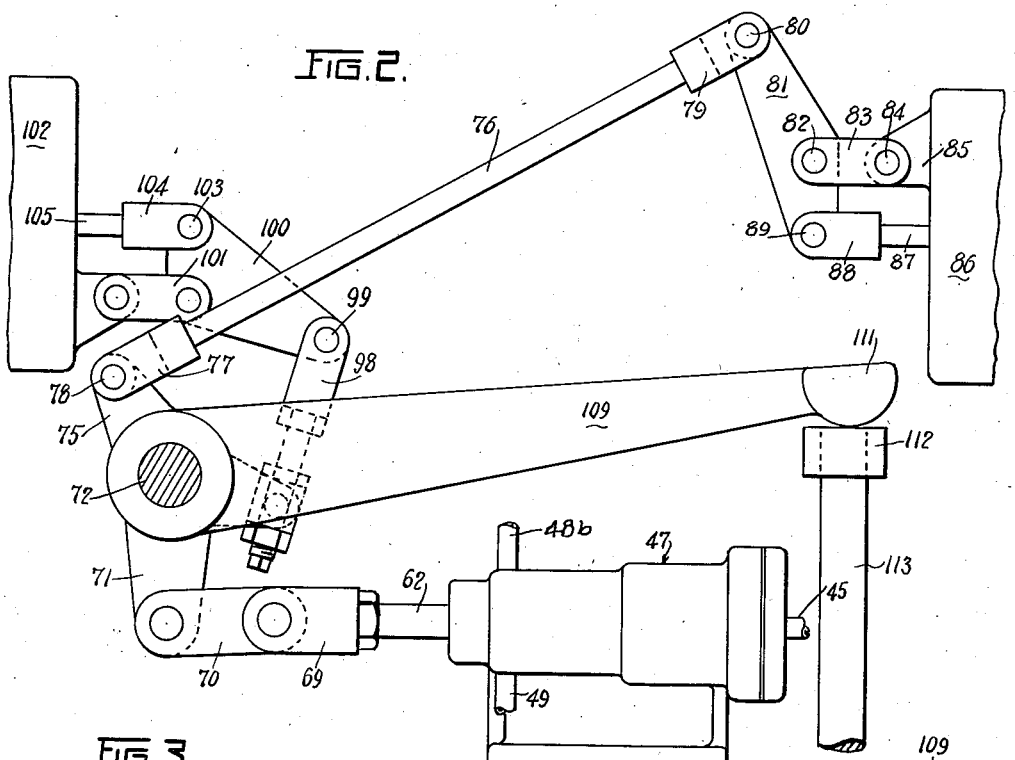

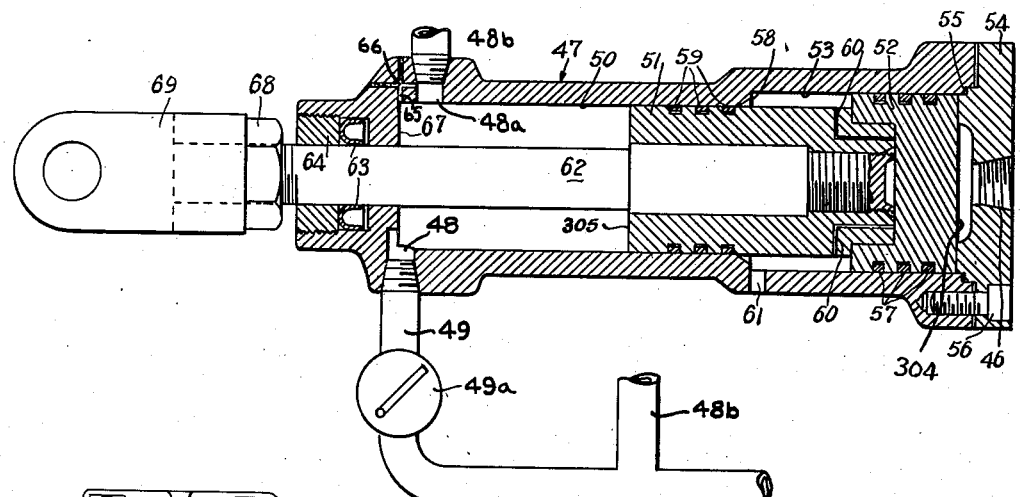
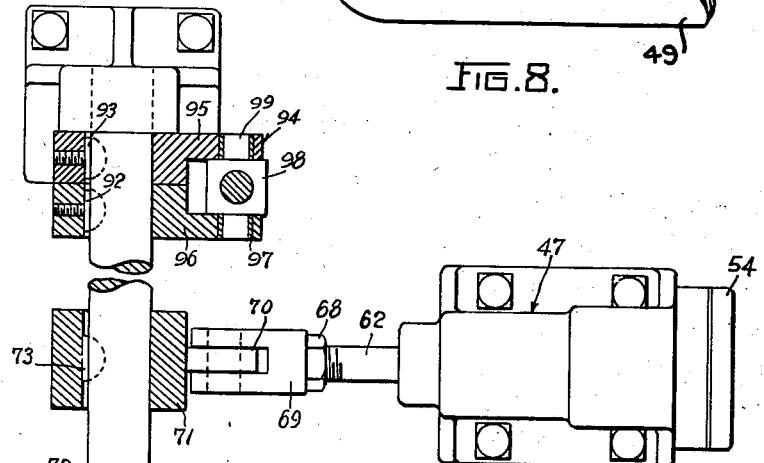
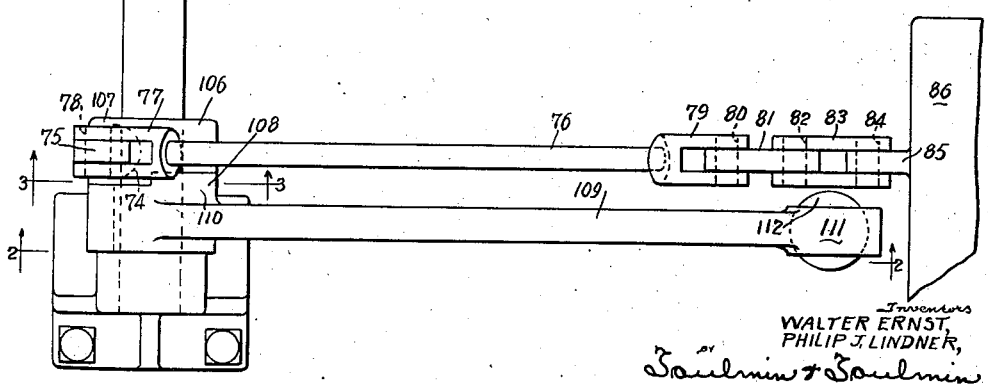

May 19, 1942.   W. ERNST ET AL   2,283,168
HIGH SPEED PRESS CONTROL
Filed Sept. 19, 1940   6 Sheets-Sheet 5

INVENTORS
WALTER ERNST
PHILIP J. LINDNER
BY
Toulmin & Toulmin
ATTORNEYS

May 19, 1942.   W. ERNST ET AL   2,283,168
HIGH SPEED PRESS CONTROL
Filed Sept. 19, 1940   6 Sheets-Sheet 6

INVENTORS
WALTER ERNST
PHILIP J. LINDNER
BY
ATTORNEYS

Patented May 19, 1942

2,283,168

UNITED STATES PATENT OFFICE 2,283,168

HIGH SPEED PRESS CONTROL

Walter Ernst and Philip J. Lindner, Mount Gilead, Ohio, assignors to The Hydraulic Development Corp., Inc., Wilmington, Del., a corporation of Delaware Application September 19, 1940, Serial No. 357,444

22 Claims. (Cl. 60—52)

This invention relates to hydraulic presses, and in particular to hydraulic presses in which provision is made for slowing down the movement of the press platen shortly before the work piece is engaged by the die connected with said platen.

Devices of this type, as heretofore known, have the drawback that if for some reason it has been omitted to insert a work piece in the press so that no resistance is encountered by the press platen, the press will immediately speed up again to full speed. This may result in injuries to the operator and also completely ruin the die.

Accordingly it is an object of the invention to provide a press of the above type in which the press platen after being slowed down, prior to reaching its work piece engaging position, will not be speeded up when it has been omitted to insert a work piece.

It is another object of the invention to provide a hydraulic press comprising a variable delivery pump for delivering pressure fluid to the press platen, in which the pumping stroke is restricted shortly before the platen reaches its work piece engaging position and is maintained restricted until a predetermined pressure builds up in the press cylinder.

A further object of the invention consists in the provision of a hydraulic press in which press platen operated electric means cause the pressure fluid supply pump to restrict its fluid delivery to the press platen shortly before the latter reaches its work piece engaging position, while low pressure responsive means changes the energization of the circuit comprising said electric means when, due to the engagement of the press platen with the work piece, a predetermined pressure builds up in the press cylinder.

It is another object of the invention to provide a hydraulic press in which the press cylinder is supplied with pressure fluid from a one-way variable delivery pump normally urged to a restricted delivery position but adapted by electric means to be shifted to full stroke delivery position, and in which said pump is allowed to return to its restricted delivery position shortly before its work piece engaging position is reached and to remain in said restricted delivery position until a predetermined pressure in the press cylinder causes a change in the energization of the circuit comprising said electric means.

It is still another object of the invention to provide a hydraulic press in which the press cylinder is supplied with pressure fluid from a reversible variable delivery pump with centering springs constantly urging the pump to neutral position, while electric means for shifting said reversible variable delivery pump is arranged so as to shift the pump to full delivery forward and retraction stroke respectively at the beginning and end of the working stroke, and to shift the pump into restricted position shortly before the point where it normally engages the work piece, in which restricted position it is maintained during the rest of the advancing stroke of the platen unless a predetermined pressure develops and acts on said press platen.

A still further object of the invention consists in the provision of a hydraulic press with a reversible variable delivery pump for supplying pressure fluid to the press cylinder, in which an electrically controlled and air pressure operated system automatically restricts the supply of pressure fluid from said pump to the press cylinder when the press platen approaches the point of travel at which the work piece is normally engaged, and in which the pump is restored to full delivery position when, due to the engagement of the work piece, a predetermined minimum pressure builds up in the press cylinder.

It is another object of the invention to provide a hydraulic press of the character set forth in the preceding paragraph, in which two variable delivery pumps are simultaneously operated by an electric control and air pressure system.

These and other objects and advantages of the invention will appear more clearly from the following specification in connection with the accompanying drawings, in which:

Figure 1 diagrammatically illustrates a press assembly according to a first embodiment of the invention.

Figure 2 shows, on a somewhat larger scale, the upper portion of Figure 1 and is supposed to be a section along the line 2—2 of Figure 8.

Figure 3 is a section along the line 3—3 of Figure 8.

Figures 4, 5 and 6 are sections similar to that of Figure 3 and show a part of the linkage system in various positions.

Figure 7 shows a section of the air cylinder used in connection with the linkage shown in Figure 2.

Figure 8 is a top view of Figure 2 partly in section.

GENERAL ARRANGEMENT

Figure 9:
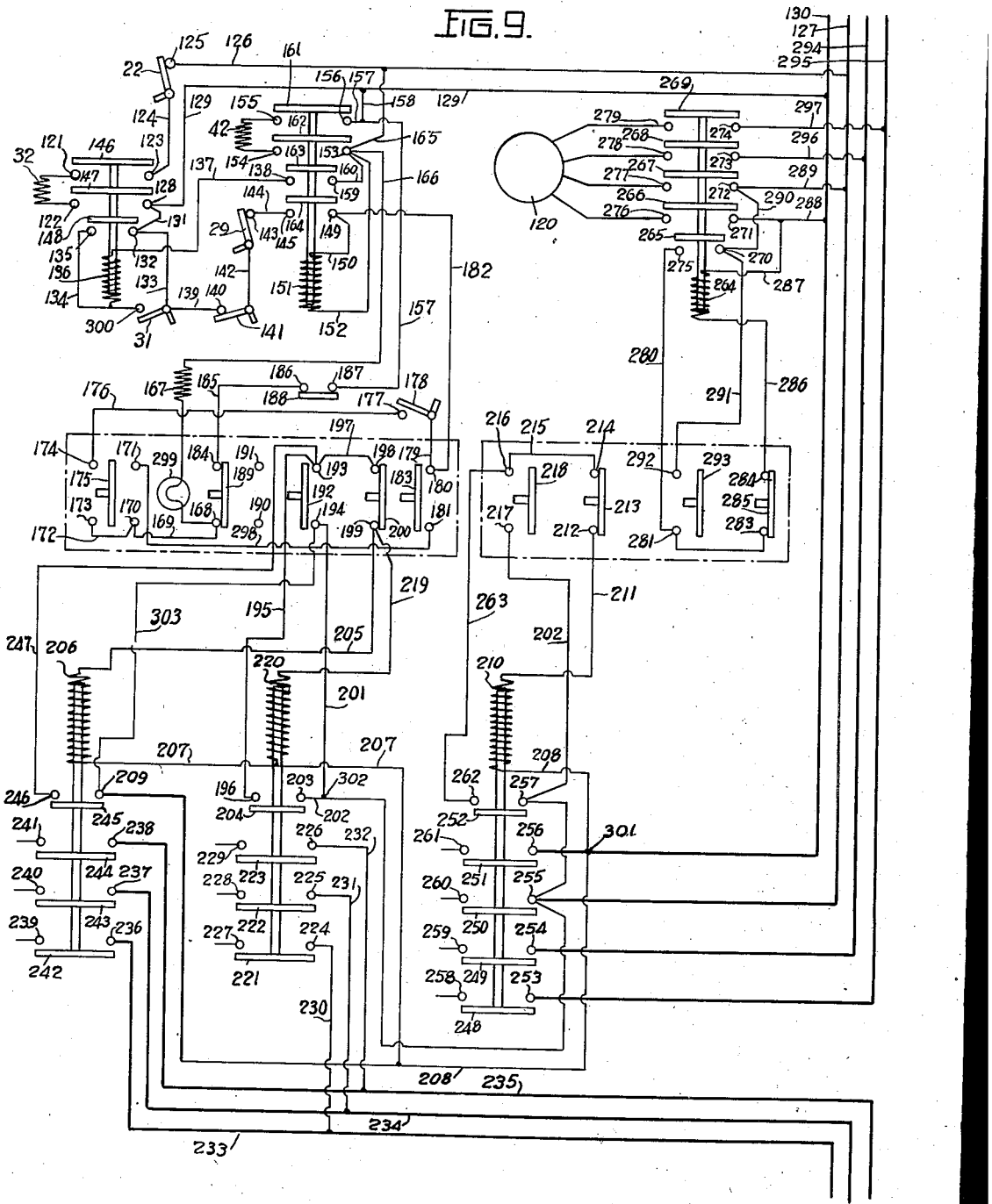
Figure 9 illustrates the electric diagram for the first embodiment of the invention shown in Figures 1 to 8.

The press according to the present invention is supplied with pressure fluid by a variable delivery pump which, when the press platen approaches a position in which the work piece is normally engaged, is shifted so as to materially reduce its delivery, thereby slowing down the movement of the press platen. The pressure now prevailing in the press cylinder is conveyed to a low pressure responsive valve which is so adjusted as to be actuated only when a minimum pressure builds up in the press cylinder due to the engagement of the die carried by the press platen with the work piece. Unless this minimum pressure is obtained, the variable delivery pump remains in its restricted delivery position. However, when the said minimum pressure is built up, actuation of the low pressure responsive valve causes a change in the energization of an electric circuit comprising means for effecting a shifting movement of the pressure pump to full forward delivery position, thereby enabling the press platen to carry out its working stroke.

According to the first embodiment of the invention shown in Figures 1 to 9, air pressure is conveyed to the smaller area of a double-acting air piston so as to put the variable delivery pump on full stroke forward position. When approaching its work piece engaging position, the press platen engages a switch which closes an electric circuit controlling the operation of an air valve which admits compressed air to the larger piston area of the said air piston operatively connected with the flow control member of the variable delivery pump. The operation of said air valve and admission of compressed air to the larger piston area of said air piston causes a restriction of the variable delivery pump, thereby slowing down the movement of the press platen. The pump remains in this restricted position unless the press platen engages a work piece so that a minimum pressure builds up in the cylinder which actuates the low pressure responsive valve in such a manner as to de-energize the circuit comprising the switch so that the air pressure acting on the smaller piston area of the air piston restores the pump to full delivery position. The press platen then continues its working stroke in the usual manner.

According to the second embodiment of the invention the air piston of the first embodiment and the linkage connected thereto is replaced by a reversible variable delivery pump with centering springs tending to hold the pump in neutral or no delivery position. The flow control member of the reversible variable delivery pump is associated with two solenoids, one of which when energized places the pump in full stroke forward position, whereas the energization of the other solenoid causes the pump to move into full stroke retraction position. The pump is furthermore associated with a preferably electrically controlled stop mechanism which prevents the pump from returning fully to neutral or no delivery position during the advancing stroke of the press platen. According to the second embodiment, the initiation of the advancing stroke of the press platen is effected by energizing the solenoid and placing the pump into full stroke forward position. As soon as the press platen approaches its work piece engaging position, an electric switch is actuated which causes de-energization of the solenoid for full stroke forward position so that the centering springs tend to move the pump to neutral position. However, the above mentioned stop acts as a latch stopping the flow control member of the pump so that a slow delivery of the pump is maintained, thereby enabling the press platen slowly to advance until due to the engagement of the die, carried by the press platen, with the work piece, a predetermined pressure builds up actuating a low pressure responsive valve. Actuation of the said low pressure responsive valve causes re-energization of the solenoid so that the pump is again shifted to full stroke. The press platen may then effect its pressing operation in the usual manner.

According to the third embodiment of the invention, the reversible variable delivery pump of the second embodiment is replaced by a one-way variable delivery pump in connection with a four-way valve. In this embodiment the variable delivery pump is continuously urged by means of a spring into a restricted delivery position, while a solenoid when energized shifts the pump against the thrust of said spring to full delivery position. The direction of flow of fluid from the pump to the cylinder is controlled by the above mentioned four-way valve. The device of the third embodiment operates similar to that of the second embodiment. To start a work stroke of the press platen, the solenoid associated with the variable delivery pump is energized, thereby placing the pump on full stroke delivery, while the four-way valve is so adjusted as to direct the fluid delivered by the pump to the advancing area of the press piston. As soon as the platen approaches the work piece engaging position, a switch is actuated which causes de-energization of the solenoid so that the spring associated with the pump shifts the pump to restricted delivery position, thereby slowing down the movement of the press piston. If due to the engagement of a work piece with the die carried by the press platen a minimum pressure builds up in the press cylinder, a low pressure responsive valve is actuated so as to restore the energization of the solenoid thereby again placing the pump on full stroke delivery position so that the press platen may effect its pressing operation.

STRUCTURAL ARRANGEMENT

Referring now to Figures 1 to 9 in detail, the press shown therein comprises a press bed 10 with a lower die 11 and a press head 12 including a press cylinder bore 13 which has reciprocably mounted therein a double-acting press piston 14 supporting the press platen 15. The upper portion of the press cylinder 13 communicates by means of a conduit 16 and a conduit 17 with one side of the reversible variable delivery pumps 18 and 19. The other side of the reversible variable delivery pumps 18 and 19 respectively communicates by conduits 20 and 21 with the lower portion of the press cylinder 13.

Connected with the conduit 16 is a low pressure responsive or tonnage control valve 22 adapted to communicate with the fluid reservoir or surge tank 23 arranged on top of the press cylinder bore 13 and adapted to supply pressure fluid to the upper portion of the cylinder bore 13 by means of a surge valve 24. The surge valve 24 is adapted to communicate through a conduit 25 with the conduit 20 and also with a conduit 26 communicating on one hand with a check valve 27 and on the other hand with a main cylinder relief and pump by-pass valve 27a. The surge valve 24 and main cylinder relief and pump by-pass valve 27a do not form a part of the present invention and for a more detailed description thereof reference may be had to U. S. Patent No. 2,193,248 to Ernst and patent application Serial No. 286,063 filed July 24, 1939, likewise to Ernst. The purpose of the surge valve 24 merely consists in prefilling the upper portion of the cylinder bore 13 when the press piston is moving downwardly by gravity, whereas the main cylinder relief and pump by-pass valve 27a facilitates the reversal of the movement of the press platen at the end of its working stroke.

Also communicating with the conduit 16 by means of a conduit 28 is a high pressure tonnage control valve 29 which, when actuated, effects the reversal of the movement of the press platen so as to cause the latter to effect its retraction stroke.

The pressing platen 15 comprises a control arm 30 adapted to actuate a switch 31 which is electrically connected with a solenoid 32 adapted to actuate a slow down valve, generally designated 33. The slow down valve 33 comprises a cylinder 34 having reciprocably mounted therein a piston 35 and communicating by means of a conduit 36 with a tank 37 filled with compressed air. Arranged in the cylinder 34 is a strong spring 308 which continuously urges the piston 35 to its lowermost position and is adapted to counteract air pressure acting through the conduit 36 upon the lower surface of the piston 35.

The conduit 36 also communicates with a conduit 38 leading to a control valve, generally designated 39. The control valve 39 comprises a cylinder 40 having reciprocably mounted therein a piston 41 the movement of which is controlled by a solenoid 42. Also in the cylinder 40 is provided a spring 307 similar to the spring 308 which continuously urges the piston 41 to its lowermost position and is adapted to counteract air pressure acting upon the lower surface of the piston 41. Each of the cylinders 34 and 40 has, at its uppermost end, a bleeder opening 43 and 44 respectively. The cylinder 34 furthermore communicates through a conduit 45 with the port 46 at one end of an air cylinder, generally designated 47, while the other end of said cylinder comprises a port 48 communicating through a check valve 49a and a conduit 49 with the cylinder 40 of the control valve 39 (see Figure 7). The air cylinder 47 comprises a cylinder bore 50 having reciprocably mounted therein a piston 51 which is adapted to move independently of but to engage a piston 52 reciprocably mounted in a bore 53 of larger diameter than the bore 50. The end adjacent the piston 52 is closed by a cylinder head 54 engaging a gasket 55 and connected to the cylinder 47 by screws 56 or any other convenient means. The piston 52 carries piston rings 57 and is U-shaped and adapted to engage a correspondingly shaped portion of the piston 51. The movement of the piston 52 is limited on one hand by the cylinder head 54 and on the other hand by the bottom portion 58 of the cylinder bore 53. The piston 51 carrying piston rings 59 is provided with L-shaped bores 60 adapted to allow fluid entrapped between the pistons 51 and 52 to escape into the left portion of the cylinder bore 53 which communicates with a bleeder opening 61. The piston 51 has threadedly connected therewith a shaft 62 passing through the other end of the cylinder 50. To prevent leakage between the cylinder bore 50 and the shaft 62, a packing 63 compressed by a nut 64 is provided. The end of the cylinder bore 50 adjacent the port 48 is provided with an exhaust bore 48a which is spaced a short distance from the extreme end of the bore 50 so that the piston 51 covers the exhaust bore 48a before the piston 51 can engage the bottom portion 67 of the cylinder bore 50. To prevent fluid from being completely entrapped between the cylinder bottom 67 and the piston 51 when the latter in its movement toward the left (with respect to Figures 1 and 7) has just closed the bore 48a, choke bores 65, 66 are provided which are plugged toward the outside but communicate with each other and with the exhaust bore 48a which in its turn communicates through conduit 48b with the conduit 49. In this way, the fluid entrapped between the cylinder bottom 67 and piston 51, when the latter has covered the exhaust bore 48a, can escape into the conduit 48b only through the choke bores 65, 66, thereby cushioning and slowing down the last portion of the movement of piston 51 toward the cylinder bottom 67. A direct escape of said entrapped fluid through the bore 48 into the conduit 49 is prevented by the check valve 49a which opens only toward the opening 48 and is arranged between the latter and the point where the conduit 48b leads into the conduit 49. Threadedly connected with the shaft 62 and secured by a nut 68 is a yoke 69 connected by means of a link 70 with an arm 71 keyed to the shaft 72 by means of a key 73 (see Figure 8). Likewise keyed to the shaft 72 by means of a key 74 is an arm 75 pivotally connected with a rod 76 by means of a yoke 77 and piston 78. The rod 76 is pivotally connected by means of a yoke 79 and pivot 80 with an arm 81. The arm 81 is mounted upon a pivot pin 82 supported by a link 83 pivotally mounted upon a pin 84 supported by the lug 85 upon the servomotor cylinder head 86. Connected with the flow control member (not shown) of the pump is a shift rod 87 pivotally connected by means of a yoke 88 and pin 89 with the lowermost portion of the arm 81. The shift rod 87 has mounted thereon an abutment 90 (Figure 1) engaged by a spring 91 urging the shift rod 87 toward the outside so as to put the pump on full stroke delivery position. Rigidly connected to the shaft 72 by keys 92 and 93 (Figure 8) is the arm 94 composed of two members 95 and 96 having a sleeve 97 therethrough on which is hinged the link 98 pivotally connected by a pivot 99 with the arm 100 which, similar to the arm 81, is connected by a link 101 with the servomotor cylinder head 102 of the pump 18. The arm 100 is furthermore pivotally connected by a pivot 103 and yoke 104 with the shift rod 105 pertaining to the flow control member of the pump 18. The shift rod 105 likewise has an abutment 90a engaged by a spring 91a. The springs 91 and 91a tend to actuate the push rods 87 and 105 respectively so as to move the pumps 19 and 18 to full stroke retraction position.

The arm 75 has connected therewith a clutch member 106 having a single jaw 107 engaged by a clutch member 108 connected with the arm 109 which arm is shiftable about the shaft 72. The clutch member 108 has likewise a single jaw 110 cooperating with the jaw 107. The arm 109 has at its free ends thereof a rounded portion 111 engaging a collar 112 provided at the uppermost portion of the push rod 113. The push rod 113 has adjustably mounted thereon a collar 114 engaging with its upper portion one end of a spring 115 the other end of which abuts an arm 116 fixed to the press head 12. The spring 115 urges the push rod 113 downwardly. Also adjustably mounted on the push rod 113 is a collar 117 adapted to be engaged by the arm 30 so as to lift the push rod 113.

The press shown in Figure 1 furthermore comprises a conveyor 118 driven by a motor 119 to carry the finished work away from the press, while a further motor, generally designated 120, is provided for driving a pump (not shown) used for circulating the coolant or cooling medium.

The specific wiring diagram as shown in Figure 9 shows two main line systems of two different voltages of which the higher voltage main supply lines are used for operating the motors driving the main pumps whereas the smaller voltage is used for operating the motors driving the conveyor and the pump used for circulating the cooling medium.

As will be seen from Figure 9, the solenoid 32 associated with the slow down valve 33 is connected on one hand with the terminal 121 and on the other hand with the terminal 122. Cooperating with the terminal 121 is a terminal 123 connected by the line 124 with one end of the normally closed low pressure tonnage control valve 22. The free end of the low pressure tonnage control valve 22 contacts in its closed position the terminal 125 connected by line 126 with the low voltage main line 127. Cooperating with the terminal 122 is a terminal 128 connected by the line 129 with the low voltage main line 130. The terminal 128 is also connected by line 131 with a terminal 132 which, in its turn, is connected by line 133 with one end of the normally open switch 31 which, as previously mentioned, is actuated by the press arm 30 for slowing down the movement of the press platen before contacting the work piece. The free end of the switch 31 when the latter is in closed position contacts a terminal 300 connected by line 134 with a terminal 135 and also with one end of a solenoid 136, the other end of which is connected by line 137 with the terminal 138. The solenoid is adapted when energized to actuate the blades 146, 147 and 148 so as to cause the same to bridge their adjacent terminals. The switch 31 is also connected by line 139 with the terminal 140 which normally engages the free end of the normally closed position reversal switch 141 which is actuated by the downward press movement for causing the press to initiate its retraction stroke. The switch 141 is connected by line 142 with the normally closed high pressure tonnage control valve 29, the free end of which when in closed position engages the terminal 143 connected by line 144 with a terminal 145. Cooperating with the terminal 145 is a terminal 149 connected by line 150 with one end of the solenoid 151, the other end of which is connected by line 152 with a terminal 153. Cooperating with the terminal 153 is a terminal 154 connected with one end of the solenoid 42, the other end of which is connected with the terminal 155. Cooperating with the terminal 155 is a terminal 156 connected by lines 157 and 158 with the line 129 leading to the low voltage main line 130. Cooperating with the terminal 138 is a terminal 159 communicating through line 160 with the terminal 153. The solenoid 151 is adapted when energized to actuate the blades 161, 162, 163 and the interlock or holding blade 164 so as to bridge their adjacent terminals. The terminal 153 furthermore communicates through line 165 with the line 126 and through line 166 with one end of a resistance 167, the other end of which is connected with the filament of a bulb 299 connected in its turn with the terminal 168. The terminal 168 is connected by line 169 with a terminal 170 adapted to cooperate with a terminal 171 and connected by line 172 with a terminal 173 cooperating with the terminal 174. A blade 175 is adapted selectively to bridge the terminals 173 and 174 when full automatic operation of the press is desired or to bridge the terminals 170 and 171 when semi-automatic operation of the press is required. The term full automatic operation means that the press performs a plurality of cycles without interruption, while the term semi-automatic operation means that the press comes to a standstill after a complete cycle. The terminal 174 is connected by line 176 with a terminal 177 adapted to be engaged by one end of the normally open auxiliary start limit switch 178 which is actuated at the retraction stroke of the press platen for enabling full automatic operation. The other end of the limit switch 178 is connected by line 179 with the terminal 180 adapted to cooperate with the terminal 181 and connected by line 182 with the terminal 149. The terminals 180 and 181 are adapted to be bridged by the push button blade 183 for causing forward movement of the press platen intended for hand starting.

The terminal 168 cooperates with the terminal 184 which is connected by line 185 with the terminal 186 normally connected with the terminal 187 by the normally closed oil temperature limit switch 188. The switch 188 is actuated by a thermostat to break the circuit and stop automatic operation when the oil temperature reaches a predetermined value. The terminal 187 is connected by line 157 with the terminal 156. The terminals 168 and 184 are adapted to be bridged by the reverse push button blade 189 which is provided with a locking ring to make automatic operation.

When hand operation is desired the switch 189 may be shifted so as to connect the contacts 190 and 191.

The main motor start button blade 192 is adapted to connect the terminals 193 and 194. The terminal 193 is connected by line 195 with a terminal 196 and by line 197 with a terminal 198 which latter is adapted to be connected with the terminal 199 by the main motor stop button blade 200. The terminal 194 is connected by lines 201 and line 202 with the treminal 203 adapted to be connected with the terminal 196 by means of the interlock or holding switch blade 204. The terminal 199 communicates through line 205 with one end of a solenoid 206, the other end of which is connected by line 207 with the line 208 leading on one hand to the terminal 209 and on the other hand to one end of a solenoid 210, the other end of which is connected by line 211 with the terminal 212. The terminal 209 is furthermore connected by line 303 with the terminal 134. The terminal 212 is adapted to be connected by the conveyor stop push button blade 213 with the terminal 214 connected by line 215 with the terminal 216 which latter is adapted to be connected with the terminal 217 by means of the conveyor start push button blade 218. The terminal 199 is furthermore connected by line 219 with one end of a solenoid 220, the other end of which is connected with the line 207. Energization of the solenoid 220 causes the interlock or holding blade 204 to connect the terminals 196 and 203 with each other. Energization of the solenoid 220 furthermore causes the switch blades 221, 222 and 223 to connect the terminals 224, 225 and 226 respectively with the terminals 227, 228 and 229. The terminals 227, 228 and 229 lead to one of the motors for driving one of the variable delivery pumps. The terminals 224, 225 and 226 are respectively connected by lines 230, 231 and 232 with the high voltage main supply lines 233, 234 and 235. The lines 233, 234 and 235 are respectively connected with the terminals 236, 237 and 238 adapted, when the solenoid 206 is energized, to be connected with the terminals 239, 240 and 241 respectively leading to another motor for driving the second variable delivery pump. The connection of the said terminals is effected in this instance by the blades 242, 243 and 244. The armature carrying the blades 242, 243 and 244 also carries an interlock or holding switch blade 245 which, when the solenoid 206 is energized, connects the terminal 209 with the terminal 246 which in its turn is connected by line 247 with the terminal 193.

The solenoid 210 controls the operation of the switch blades 248, 249 and 250 and 251 and also of the interlock or holding switch blade 252 so that energization of the solenoid 210 causes the said blades to connect the terminals 253, 254, 255, 256 and 257 respectively with the terminals 258, 259, 260, 261 and 262. While the terminal 262 is connected by line 263 with the terminal 216, the terminals 258, 259, 260 and 261 lead to the motor 119 for driving the conveyor 118.

The solenoid 264 controls the operation of the interlock or holding switch blade 265 and of the switch blades 266, 267, 268 and 269 in such a manner that energization of the solenoid 264 causes the said blades respectively to connect the terminals 270, 271, 272, 273 and 274 with the terminals 275, 276, 277, 278 and 279. The terminals 276, 277, 278 and 279 lead to the motor 120 for driving the pump used for circulating the cooling medium. The terminal 275 is connected by line 280 with the terminal 281 which in its turn is connected by line 282 with the terminal 283. The terminal 283 is normally connected with the terminal 284 by the cooling pump switch blade 285 which when breaking the contact between the terminals 283 and 284 causes the said cooling pump to stop. The terminal 284 is connected by line 286 with one end of the solenoid 264. The other end of the solenoid 264 is connected by line 287 with the line 288 connected on one hand with the terminal 271 and on the other hand with the low voltage supply line 130. The terminal 272 is connected with the low voltage supply line 127 by line 289 on one hand and on the other hand by line 290 with the terminal 270 which in its turn is connected by line 291 with the terminal 292. The terminals 292 and 281 may be bridged by the normally open cooling pump start switch blade 293. The terminals 273 and 274 are respectively connected with the low voltage supply lines 294 and 295 by lines 296 and 297.

*Operation of first embodiment (Figures 1 to 9)*

In order to start the operation of the press the switch blade 192 is actuated so as to connect the terminals 193 and 194, while the switch blades 218 and 293 are also actuated so as to bridge their adjacent terminals. Closure of the switch blades 192, 218 and 293 establishes the following circuits:

From the low voltage supply line 127 current flows through lines 289, 290 and 291, the now closed switch blade 293, line 282, switch blade 285 and line 286 to the solenoid 264 from which the current flows through line 287 to the low voltage main supply line 130. In this way solenoid 264 is energized and causes the closure of the blades 265, 266, 267, 268 and 269. The blade 265 establishes a holding circuit for the solenoid 264 inasmuch as the current now flows from the line 130 through lines 288, 287, the solenoid 264, line 286, blade 285, line 282, terminal 281, line 280, blade 265 and lines 290 and 289 back to the main supply line 127. Consequently the blades 266, 267, 268 and 269 remain in contact with their adjacent terminals so that current flows from the main supply lines 130, 127, 294 and 295 respectively to the lines 288, 289, 296 and 297 and the blades 266, 267, 268 and 269 to the terminals 276, 277, 278 and 279 from where the current flows to the motor driving the cooling pump for the oil.

The closure of the main motor start switch blade 192 causes the current to flow from the low voltage main supply line 130 to the connection point 301 and from there through lines 208 and 207 to the solenoids 220 and 206 respectively, from where the current flows through the lines 219 and 205 respectively to the terminal 199. From here the current flows through the main motor stop button blade 200, line 197, now closed main motor start switch blade 192 and line 201 to the junction point 302. From here the current flows through the line 202 to terminal 255 and from there back to the low voltage main supply line 127. In this way the solenoids 206 and 220 are energized, thereby causing their respective blades 242, 243, 244 and 245 and blades 221, 222, 223 and 204 to bridge their adjacent terminals. Bridging of the terminals 246 and 209 by the holding blade 245 establishes a holding circuit for the solenoid 206, and bridging of the terminals 203 and 196 by the holding blade 204 establishes a holding circuit for the solenoid 220 in the following manner:

Current from the low voltage main supply line 130 flows through the junction point 301 and the line 208 through the terminal 209 and from there through the blade 245, the terminal 246, line 247, terminal 193, line 195, terminal 196, holding blade 204, terminal 203, line 202, terminal 255 back to the main supply line 127. In case only one pump is to be driven so that the solenoid 220 is not needed, the holding circuit for the solenoid 206 will be established through the line 303 leading to the terminal 194. Since, due to the holding circuits the blades 242, 243 and 244 and also the blades 227, 228 and 229 are held in contact with their adjacent terminals, current will flow from the high voltage main lines 233, 234 and 235 through the blades 242, 243 and 244 and the terminals 239, 240 and 241 into one motor for driving one pump, for instance pump 18 and through the lines 230, 231 and 232 and the blades 221, 222 and 223 into the terminals 227, 228 and 229 from where the current will flow to the other motor for driving the other pump, for instance pump 19.

Closure of the conveyor start blade 218 causes current to flow from the low voltage main supply line 130 to the connection point 301 and from there through line 208, solenoid 210, line 211, switch blade 213, line 215, now closed blade 218, line 202 to the terminal 255 and from here back to the main supply line 127. In this way solenoid 210 is energized causing the blades 248, 249, 250, 251 and 252 to bridge their adjacent terminals. Bridging of the terminals 262 and 257 by the blade 252 establishes a holding circuit for the solenoid 210 inasmuch as current now flows from the main supply line 130, through connection point 301, line 208, solenoid 210, line 211, switch blade 213, line 215, line 263, terminal 262, blade 252, terminal 257, line 202, terminal 255 and from here back to the main supply line 127. The connection of the terminals 253, 254, 255 and 256 with their corresponding terminals 258, 259, 260 and 261 by the blades 248, 249, 250 and 251 enables current to flow from the main supply lines 130, 127, 294 and 295 to terminals 258, 259, 260 and 261 and from there to the motor 119 for driving the conveyor 118.

Supposing a semi-automatic operation of the press is desired. To this end the operator actuates the switch blade 175 so as to cause the latter to connect the terminals 170 and 171 with each other, while simultaneously the forward push button blade 183 is actuated to connect the terminals 180 and 181. This simultaneous operation of the two blades 175 and 183 will force the operator to use both hands, thereby causing him to withdraw his hands from the space below the press platen. Current will then flow from the main supply line 127 through lines 126 and 165 to the terminal 153 from where it flows through the line 152, the solenoid 151, line 150, terminal 149, line 182, the now closed switch blade 183, line 298, terminal 171, the now closed switch blade 175, terminal 170, line 169 to terminal 168. From here the current flows through the reverse push button blade 189, line 185, the normally closed oil temperature limit switch 188, line 157 and lines 158 and 129 to the main supply line 130. Simultaneously current flows from the supply line 127 through lines 126, 165 and 166, resistance 167, bulb 299 to the terminal 168 from where it returns to the main supply line 130 through switch blade 189, line 185, blade 188 and lines 157, 158 and 129. The illumination of the bulb 299 indicates in this way that the desired circuits are properly established. Energization of the solenoid 151 causes the blades 161, 162, 163 and the interlock or holding blade 164 to bridge their adjacent terminals so that a holding circuit for the solenoid 151 is established through the lines 130, 129, terminal 128, lines 131, 133 and 139, position reversal switch 141, line 142, the high pressure control valve 29, line 144, the terminal 145, holding blade 164, terminal 149, line 150, solenoid 151, line 152, terminal 153, lines 165 and 126 to the main supply line 127. The blades 161, 162 and 163 therefore remain in contact with their adjacent terminals and establish circuits which will now be described.

The blade 163 bridges the terminals 159 and 138 while the blades 161 and 162 respectively bridge the terminals 153, 154, 156 and 155. Consequently current flows from the main supply line 130 through the line 158, terminal 156, blade 161, terminal 155, solenoid 42, terminal 154, blade 162, terminal 153 and lines 165, 126 back to the main supply line 127. The solenoid 42 actuates the control valve 39 so as to lift the valve piston 41, thereby establishing communication between the conduit 38 and the conduit 49. Compressed air now flows through the line 36, the control valve 39, the conduit 49 and the check valve 49a, from where it flows through the port 48 into the cylinder bore 50 of the air cylinder 47. The air pressure acting on the piston 51 now moves the latter toward the right with respect to Figure 7. This movement is transferred to the shaft 62 which, by means of the arm 71 keyed to the shaft 72, shifts the latter so as to actuate the rod or lever 76 and the arm 94 for moving the pumps 19 and 18 into full stroke delivery position. When the shaft 72 is thus shifted, the jaw 107 keyed to shaft 72 has moved from its Figure 3 position into the position shown in Figure 4, whereas the jaw 110 on arm 109 is still held in its Figure 3 position by the platen arm 30 and push rod 113. Fluid pressure is now delivered by the pumps 18 and 19 through conduits 17 and 16 into the upper portion of the press cylinder 13 so that the press piston 14 and platen 15 move downwardly by gravity. While this movement occurs, the push rod 113 due to the spring 115 follows the arm 30, and the arm 109 being free to move about shaft 72 follows the downward movement of the push rod 113 so as to maintain its rounded portion 111 in contact with the collar 112 on the push rod 113. In this way the jaw 110 moves from its Figure 4 position toward the position shown in Figure 5. As soon as the press platen approaches the position where it normally engages a work piece, the arm 30 actuates the switch 31 so as to close the latter. Since, as mentioned above, due to the energization of the solenoid 151, the blade 163 had established contact between the terminals 159 and 138, the closure of the switch 31 now causes current to flow from the low voltage main supply line 130 through lines 129, 131 and 133 to the now closed switch 31 and from there through the solenoid 136, the line 137, the blade 163 and the lines 160, 165 and 126 back to the main supply line 127. Energization of the solenoid 136 causes the blades 148, 147 and 146 to bridge their adjacent terminals. Connection between the terminals 132 and 135 by the blade 148 establishes a holding circuit for the solenoid 136 inasmuch as now the current flows from the line 130 through the lines 129 and 131, the blade 148, the line 134, solenoid 136, line 137, blade 163 and lines 160, 165 and 126 to the main supply line 127. Bridging of the terminals 128 and 122 by the blade 147 and of the terminals 123 and 121 by the blade 146 causes current to flow from the main supply line 130 through line 129, blade 147, solenoid 32, blade 146, normally closed low pressure tonnage control valve 22 and line 126 to the main supply line 127. In this way the solenoid 32 is energized and causes an upward movement of the slow down piston 35 so that compressed air flows from the tank 37 through the line 36, the slow down cylinder 33 and the line 45 from where it passes through the port 46 of the air cylinder 47. The compressed air entering through the port 46 now acts upon the piston area 304 of the piston 52 and inasmuch as the piston area 304 is larger than the piston area 305 of the piston 51 on which the compressed air admitted through the port 48 acts, the piston 52 moves toward the left with regard to Figure 7, thereby also moving the piston 51 toward the left until the piston 52 abuts the bottom portion 58 of the cylinder bore 53. This movement is again conveyed to the shaft 62 which actuates through the previously mentioned connections the shaft 72 so as to cause the arm 94 and the rod 76 to move the pumps 18 and 19 to a restricted position in which only a small quantity of fluid is delivered to the upper portion of the press cylinder bore 13. The downward movement of the press piston 14 is therefore slowed down in accordance with the rate at which the pump withdraws fluid from the retraction side of the press piston 14. Although the platen arm 30, after a very short time, disengages the switch 31 so that the latter is open again, this will not affect the slow down movement due to the fact that the solenoid 136 remains energized by the holding circuit through the blade 148. While the press piston 14 moves downwardly by gravity, the surge valve 24 is opened, thereby admitting fluid from the fluid tank to the upper portion of the press cylinder 13 to supplement the fluid delivered by the pump. The downward movement of the press piston 14 therefore continues with reduced speed until the platen 15 comes to a standstill by engaging the lower die unless a work piece was placed on the press bed and engaged by the die connected to the platen. If during the downward movement of the press piston 14 the die connected with the platen engages a work piece, pressure starts to build up in the upper portion of the press cylinder 13 and as soon as a minimum pressure is attained the surge valve 24 closes, whereas the low pressure tonnage control valve 22 opens. Opening of the low pressure tonnage control valve 22 breaks the circuit through the solenoid 32 so that the control valve piston 35 returns to its lowermost position, thereby interrupting communication between the air tank 37 and conduit 36 on one hand and the conduit 45 on the other hand. Since furthermore now the conduit 45 is adapted to communicate with the bleeder opening 43, the pressure acting through conduit 49 upon the piston area 305 of the piston 51 causes the piston 51 to move toward the right with respect to Figure 7 until piston 52, moved by the piston 51, engages the cylinder head 54. This movement is again transferred through the shaft 62 upon the shaft 72 with the result that due to the linkage interconnecting the shaft 72 and the pumps 18 and 19, the pumps 18 and 19 are again moved to full stroke delivery position. As a result thereof the downward movement of the press piston 14 is speeded up and the actual pressing operation is effected with high speed. As soon as the pressing operation is finished and a predetermined high pressure built up in the upper portion in the cylinder bore 13, the high tonnage control valve 29 is actuated by the said high pressure so as to break the holding circuit for the solenoid 151. As a result thereof the blades 161 and 162 return to their open position so that the solenoid 42 is deenergized and the control valve piston 41 returns to its lowermost position. In this position the communication between the air tank 37 and the conduit 49 is interrupted, while the conduit 49 now communicates with the bleeder opening 44. The springs 91 and 91a are, therefore, not opposed by air pressure acting on the pistons 51 and 52 so that the said springs will actuate their respective shift rods 81 and 105 so as to move the pumps 18 and 19 into full stroke retraction position. Due to the provision of the small choke openings 60, 65 and 66 a throttling action is produced at the point of reversal of the reversible variable delivery pumps so that a smooth initiation of the retraction stroke is obtained. The shifting of the pumps into full stroke retraction position causes a corresponding movement of shaft 72 due to the linkage 81, 76, 75 so that the jaw 107 is moved into its Figure 6 position. When the press platen 15 now moves upwardly its arm 30 will, by engagement with the collar 117, lift the push rod 113 at the end of its retraction stroke so that the collar 112, by engagement with the rounded portion 111 of the arm 109, causes a shifting movement of the arm 109 and the shaft 72 so that the pumps 18 and 19 return to substantially zero or no delivery position, and the jaw 110 moves from the position of Figure 6 into the position of Figure 3. The press piston 14 therefore comes to a standstill and the press is now ready for a new cycle. If, due to leakage, the press piston 14 should slightly move downwardly the push rod 113 will likewise move downwardly and so will the arm 109, thereby allowing the springs 91 and 91a to put the pumps again in retraction stroke position. The piston 14 will then be lifted to its previous position where the press again comes to a standstill.

If full automatic operation is desired, the blade 175 is actuated so as to connect the terminals 173 and 174. The operation of the press will then be carried out in the same manner as previously described. However, in contradistinction to the semi-automatic operation, the push rod 113 having adjustably mounted thereon a collar 306 moves the auxiliary start limit switch 178 so as to close the latter. This establishes a circuit comprising the lines 130, 129, 158, 157 switch blade 188, line 185, blade 189, lines 169 and 172, blade 175, line 176, switch 178, line 182, line 150, solenoid 151 and lines 152, 165, 126 and the main supply line 127. Consequently the solenoid 151 is energized thereby causing the blades 164, 163, 162 and 161 again to bridge their adjacent terminals in the manner previously described with the result that a new pressing cycle is started. By disconnecting the blade 175, the full automatic operation may be interrupted when desired.

It will be noted that although at the semi-automatic operation the switch 178 will temporarily be closed, this will not cause energization of the solenoid 151 since the blade 175 does not bridge the terminals 173 and 174.

By disconnecting the blade 213 from the adjacent terminals 212 and 214 the circuit through the solenoid 210 is broken with the result that the conveyor motor 119 comes to a standstill.

By disconnecting the switch blade 285 from the terminals 283 and 284 the circuit through the solenoid 264 is broken thereby interrupting the supply of current to the cooling pump motor.

Similarly by disengaging the switch blade 200 from the terminals 198 and 199 the circuit comprising the solenoids 220 and 206 is broken thereby interrupting the supply of current from the main lines 233, 234 and 235 to the motors driving the variable delivery pumps 18 and 19. If neither semi-automatic nor full automatic operation of the press is required and it is merely desired to operate the press by hand, for instance for adjusting purposes, the switch blade 189 is removed from its terminals 168 and 184 and moved to contact the dead terminals 190 and 191.

Summary of Operation

To sum up the operation described above it may briefly be pointed out that after the motors for the pumps 18 and 19 and the motors for the conveyor 118 and a further motor for a pump intended to cool the fluid are started, the solenoid 42 is energized so as to lift the control valve piston 41. Air pressure now passes from the air tank through the control valve 39 into the air cylinder 47 so as to cause the shaft 62 to move the pumps 18 and 19 into full stroke forward position. Pressure fluid is now delivered by the pumps into the upper portion of the press cylinder 13 and while the piston 14 moves downwardly by gravity is supplemented by fluid from the tank by the surge valve 24. Shortly before the platen 15 approaches its normal work piece engaging position, the platen arm 30 actuates the switch 31 which is electrically connected with the solenoid 32 so as to energize the latter, thereby lifting the slow down piston 35 against the thrust of the spring 308 and establishing communication between the conduit 36 and conduit 45. As a result thereof compressed air from the tank 37 enters the air cylinder 47 and moves the shaft 62 to such an extent that the latter causes movement of the pumps 18 and 19 to a materially restricted delivery position. The fluid expelled during this stroke of the piston in the air cylinder 47 passes through the conduit 48b, conduit 49, control valve 39 into the conduit 38 and from there into the conduit 36. Since now only a small quantity of fluid per stroke of the pumps 18 and 19 is withdrawn from the lower portion of the press cylinder 13, the press piston 14 moves downwardly very slowly. This slow movement continues until the lower die is engaged unless a work piece placed on the press bed engages the die connected to the platen 15. If this latter happens, a pressure starts to build up in the upper portion of the press cylinder 13 so that the surge valve 24 closes. As soon as a minimum pressure is established in the upper portion of the press cylinder 13, it actuates the low pressure tonnage control valve 22 so as to deenergize the solenoid 32. As a result thereof the spring 308 pushes the piston 35 to its lowermost position. Compressed air may then escape from the conduit 45 through the bleeder opening 43 while the compressed air passing through the control valve 39 and the conduit 49 again shifts the shaft 62 toward the right, thereby again placing the pumps 18 and 19 on full stroke delivery position. The press now performs its pressing stroke at the end of which, when a predetermined high pressure is obtained, the high pressure tonnage control valve 29 is actuated so as to break the circuit through the solenoid 42. The spring 307 in the control valve 39 then pushes the valve piston 41 downwardly so as to interrupt communication between the conduits 36 and 49 while allowing the compressed air to escape from the conduits 48b and 49 to the bleeder opening 44. The springs 91 and 91a of the pumps 19 and 18 now do not encounter any material resistance so that they shift the pumps 18 and 19 to full delivery retraction position. The platen 15 now moves upwardly and at the end of its retraction stroke actuates, by means of the push rod 113, the arm 109 so as to cause the latter to move the pumps to neutral position in case the press was adjusted for semi-automatic operation. If the press was adjusted for full automatic operation, the solenoid 42 is again energized to cause a new cycle.

While the press above discussed has been described in connection with two pumps it is understood of course that they may be replaced by a single pump without affecting the operation of the press.

Second embodiment

Figure 10:
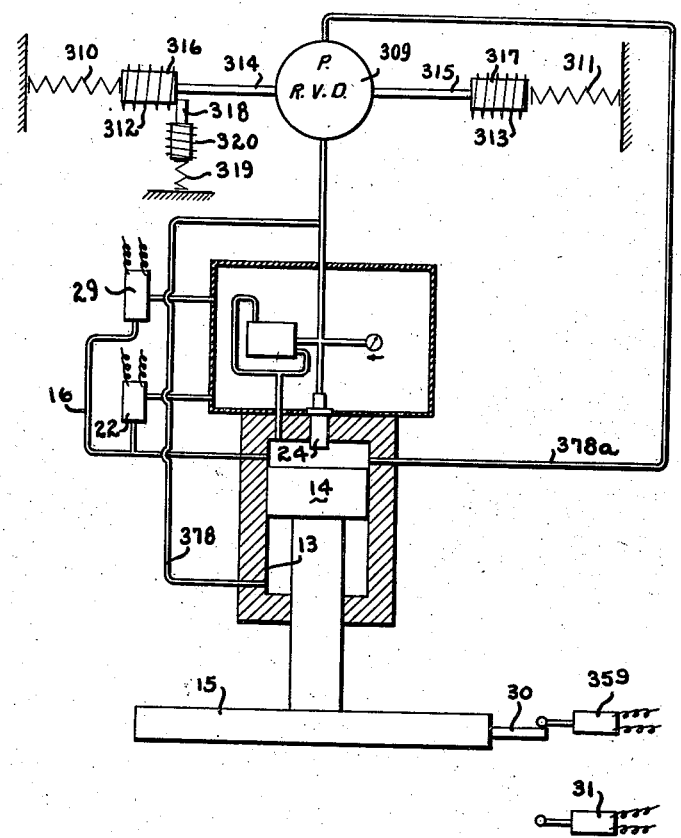
Figure 10 is a second embodiment of the invention in which the linkage system with the air cylinder of the first embodiment of the invention has been replaced by a solenoid operated system.

The press illustrated in Figure 10 corresponds in principle to the press illustrated in Figures 1 to 9, and similar parts are therefore designated with the same reference characters. However, while the variable delivery pump 18 or 19 of the first embodiment is provided with a spring 91a and 91 respectively, continuously urging the pump into full delivery retraction stroke position, the variable delivery pump 309 shown in Figure 10 is associated with two centering springs 310, 311 which continuously tend to move the pump to neutral or no delivery position. The pump 309 has furthermore associated therewith on each side thereof a solenoid 312 and 313 respectively adapted to counteract the springs 310 and 311. The flow control member of the pump 309 has two push rods 314 and 315 which are each provided with an enlarged portion 316, 317, forming the armature for the solenoids 312 and 313. Adjacent the enlarged portion 316 is arranged a stop 318 continuously urged by a spring 319 toward the push rod 314 but adapted by means of the solenoid 320 to be moved away from the push rod 314 against the thrust of the spring 319.

Figure 11:
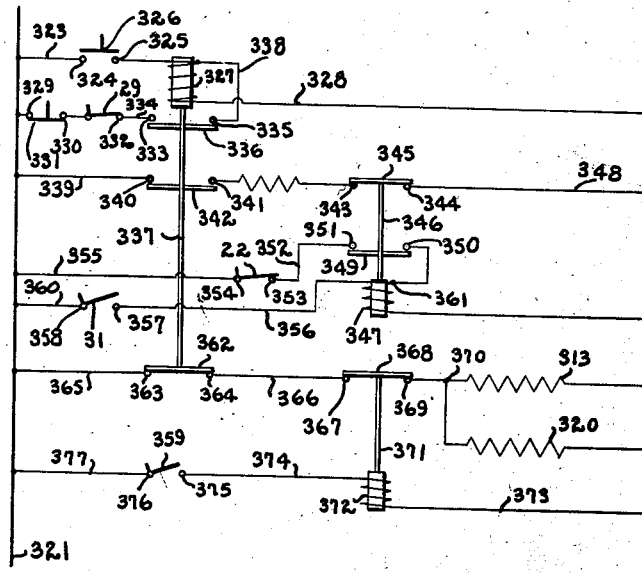
Figure 11 is an electric diagram for the device shown in Figure 10 in which those parts not necessary for the understanding of Figure 10 have been omitted.

The electric circuit for Figure 10, as far as it differs from the electric circuit shown in Figure 9, is illustrated in Figure 11. The numerals 321 and 322 designate two main supply lines of which the line 321 is connected by means of a line 323 with a terminal 324 adapted to be connected with a terminal 325 by a starter switch 326. The terminal 325 is connected with one end of the solenoid 327, the other end of which is connected by line 328 with the other main supply line 322. The line 321 is furthermore connected with a terminal 329 normally connected with the terminal 330 by the normally closed emergency switch 331. The terminal 330 is connected with the normally closed high pressure tonnage control valve 29 which in its closed position engages the terminal 332 connected with the terminal 333 by line 334. The terminal 333 is adapted to be connected with the terminal 335 by means of the switch blade 336 arranged on the armature 337 pertaining to the solenoid 327. Also connected with the line 321 is a line 339 comprising a terminal 340 which latter is adapted to be connected with the terminal 341 by the blade 342 likewise arranged on the armature 337. The terminal 341 is connected with one end of the solenoid 312, the other end of which is connected with the terminal 343. The terminal 343 is adapted to be connected with the terminal 344 by means of the normally closed blade 345 carried by the armature 346 cooperating with the solenoid 347. The terminal 344 is connected by line 348 with the main supply line 322. Also connected with the armature 346 is the normally open blade 349 which in its closed position connects the terminals 350 and 351 with each other. The terminal 351 is connected by line 352 with the terminal 353 normally connected by means of the normally closed tonnage control valve 22 with the terminal 354 which in its turn is connected by line 355 with the main supply line 321. The terminal 350 is connected by line 356 with the terminal 357 adapted to be connected with the terminal 358 by means of the normally open switch 31. The terminal 358 is connected by line 360 with the supply line 321. Connected with the junction point 361 in the line 356 is one end of the solenoid 347, the other end of which is connected with the supply line 322.

The armature 337 has furthermore connected therewith a blade 362 which normally connects the terminals 363 and 364 with one another. The terminal 363 is connected by line 365 with the main supply line 321, while the terminal 364 is connected by line 366 with the terminal 367 normally connected by blade 368 with the terminal 369. The terminal 369 is connected with the junction point 370 which in its turn is connected with one end of the solenoid 313, the other end of which is connected with the supply line 322. The junction point 370 is furthermore connected with one end of the solenoid 320, while the other end thereof is connected with the supply line 322. The blade 368 is connected with an armature 371 cooperating with the solenoid 372. One end of the solenoid 372 is connected by line 373 with the supply line 322, whereas the other end of the solenoid 373 is connected by line 374 with the terminal 375 adapted to be connected by means of the switch 359 with the terminal 376 which in its turn is connected by line 377 with the main supply line 321.

*Operation of second embodiment*

Suppose that the pump 309 is in its neutral position in which the armature 316 of the solenoid 312 is not impeded in its movement by the stop 318. In order to start a working stroke of the press, the starter switch 326 is actuated so as to connect the terminals 324 and 325 with each other. This causes current to flow from the supply line 321 through the line 323, the blade 326, terminal 325, the solenoid 327 and the line 328 to the second supply line 322. Energization of the solenoid 327 causes attraction of the armature so that the blade 336 bridges the terminals 333 and 335, thereby establishing a holding circuit through line 321 with the normally closed emergency switch 331, high pressure tonnage control valve 29, line 334, blade 336, line 338, solenoid 327, line 328 and line 322. Although the starter switch 326 will now return to open position, the armature 337, due to the just mentioned holding circuit, remains attracted. Therefore, blade 342 bridges the terminals 340 and 341 so that current flows from the line 321, through the line 339, blade 342, the solenoid 312, the closed blade 345 and the line 348 to the main supply line 322. On the other hand, the blade 362 will disengage the terminals 363 and 364. Energization of the solenoid 312 moves the shift rod 314 and thereby the flow control member toward the left against the thrust of the spring 310 so as to move the pump 309 into full delivery forward position. Now pressure fluid is delivered by the pump 309 through line 378a into the upper portion of the press cylinder 13, while the fluid expelled from the lower portion of the press cylinder 13 may escape through the line 378 to the suction side of the pump. As soon as the press piston 14 approaches its normal work piece engaging position, the press arm 30 actuates the switch 31 so as to cause the latter to bridge the terminals 356 and 357. Now current flows from the line 321 through the line 360, the now closed switch 31, the line 356 and the solenoid 347 to the other supply line 322. As a result thereof the armature 346 is lifted so that the contact between the terminals 343 and 344 is broken, thereby de-energizing the solenoid 312, while contact is established between the terminals 351 and 350 by means of the blade 349. A holding circuit for the solenoid 347 is now established through the lines 321 and 355, the low pressure tonnage control valve 22, line 352, blade 349, solenoid 347 and the line 322. De-energization of the solenoid 312 causes the centering spring 310 to move the armature 316 again to the right. However, when armature 316 was moved toward the left the spring 319 had pushed forward the stop 318 which now prevents full return movement of the armature 316 so that the pump 309 cannot return to zero position but remains in restricted delivery forward position. Consequently, the press piston 14 moves downwardly with a materially reduced speed and continues this low speed movement until the die carried by the platen engages the lower die unless the die carried by the platen engages a work piece placed on the press bed. If this latter happens, pressure begins to build up in the upper portion of the cylinder bore 13 with the result that the surge valve 24 closes. As soon as a predetermined minimum pressure has been obtained, the low pressure tonnage control valve 22 opens, thereby breaking the holding circuit for the solenoid 347. As a result thereof the armature 346 moves downwardly to its previous position so that the circuit through the solenoid 312 is again closed. Re-energization of the solenoid 312 causes the shift rod 314 again to move toward the left against the thrust of the spring 310, thereby again placing the pump into full stroke forward delivery position. The press now continues its pressing stroke until a predetermined high pressure is obtained which actuates the high pressure tonnage control valve 29 so as to cause the latter to disengage the terminal 332, thereby breaking the holding circuit for the solenoid 327. As a result thereof the armature 337 returns to its lowermost position in which the blades 336 and 342 disengage their adjacent terminals, while the blade 362 bridges the terminals 363 and 364. Consequently, current now flows from the main supply line 321 through the line 365, the blade 362, line 366, blade 368, through both the solenoids 370 and 320 to the main supply line 322. In this way the solenoids 370 and 320 are energized with the result that the stop 318 is withdrawn, while the armature 317 is moved against the thrust of the spring 311 toward the right so as to place the pump 309 on full stroke retraction position. The pump now delivers pressure fluid through line 378 into the lower portion of the cylinder bore 13, while the fluid expelled from the upper portion of the press cylinder bore 13 may escape through the line 378a. When the platen 15 reaches the end of its retraction stroke the platen arm 30 actuates the switch 359 so as to close the latter, thereby causing current to flow from the supply line 321 through the line 377, switch 359, line 374, solenoid 372 and line 373 to the supply line 322. Energization of the solenoid 372 causes a lifting movement of the armature 371 with the blade 368, thereby breaking the circuit comprising the solenoids 313 and 320. Since the solenoid 312 was previously de-energized, the centering spring 311 now moves the shift rod 315 toward the left so as to move the pump 309 to neutral or no delivery position. The device is now ready for a new cycle. It will be noted that the movement of the shift rods 315 and 314 by the spring 311 is not impeded by the stop 318 since the latter merely engages the longitudinal wall portion of the armature 316.

Third embodiment

Figure 12:
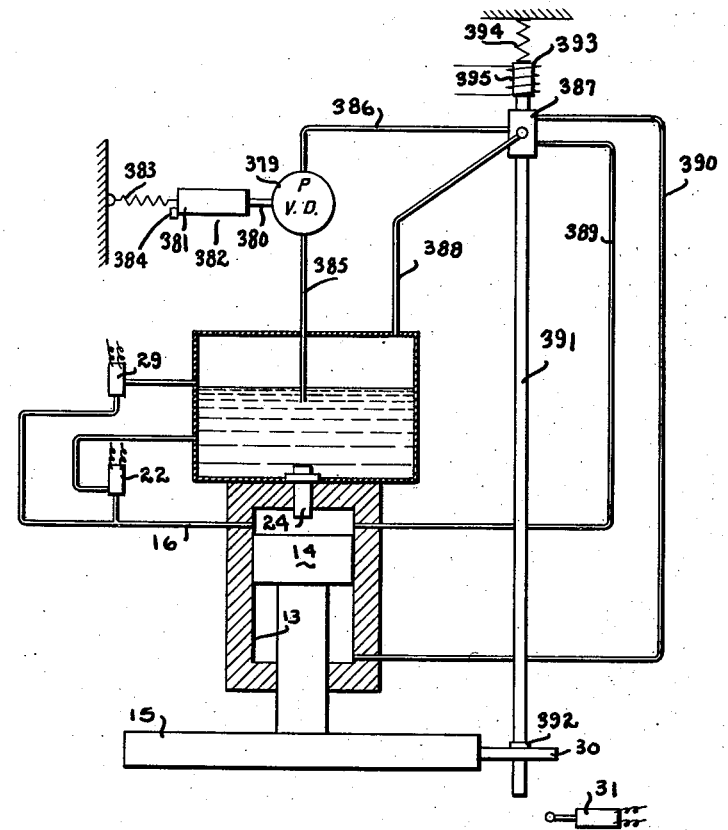
Figure 12 is a third embodiment of the invention in which the reversible variable delivery pump of Figure 10 has been replaced by a one-way variable delivery pump.

According to the third embodiment illustrated in Figure 12, the reversible variable delivery pumps of the first and second embodiments are replaced by a one-way variable delivery pump 379. The flow control member (not shown) of the variable delivery pump 379 is adapted to be shifted from a restricted delivery position to a full stroke delivery position and vice versa. To this end the flow control member is connected with a shift rod 380 carrying an armature 381 and cooperating with a solenoid 382 in such a manner that energization of the solenoid 382 actuates the shift rod 380 so as to cause the pump to move to full stroke delivery position. The armature 381 and thereby the shift rod 380 is continuously urged toward the left side with respect to Figure 12 by spring 383 so as to move the pump 379 to restricted delivery position. A stop 384 prevents the shift rod 380 from moving the pump to zero or neutral position. The suction side of the pump 379 is connected by means of the conduit 385 with the fluid tank 23, while the pressure side of the pump 379 communicates through a conduit 386 with a four-way valve 387. The four-way valve 387 does not form a part of the present invention and may be of the type described in detail in U. S. Patent No. 2,190,939 to Ernst. The four-way valve 387 has a connection 388 with the fluid tank 23 and two further connections 389, 390 respectively, leading to the upper and lower portion of the press cylinder bore 130. The four-way valve 387 is controllable by a valve rod 391 having at its lower end a collar 392 adjustably mounted thereon which is adapted to be engaged by the platen arm 30 when the platen approaches the end of its retraction stroke. The upper portion of the valve rod 391 is provided with an armature 393 which is continuously urged downwardly by a spring 394 but adapted by energization of the solenoid 395 to be lifted against the thrust of the spring 394. As in the previously described device, the upper portion of the press cylinder bore 13 communicates with a conduit 16 which in its turn communicates with a low pressure tonnage control valve 22 and a high pressure tonnage control valve 29 in the manner described in connection with Figure 1. However, while in the embodiments of Figures 1 and 11 the high pressure tonnage control valve 29 is normally closed and opens a circuit when a predetermined high pressure is obtained, the high pressure tonnage control valve 29 in the embodiment of Figure 12 is normally open and closes the circuit when a predetermined high pressure has been obtained. The remaining parts of the embodiment of Figure 12 correspond to those described in connection with Figure 1 and are therefore designated with the same reference numerals.

Figure 13:
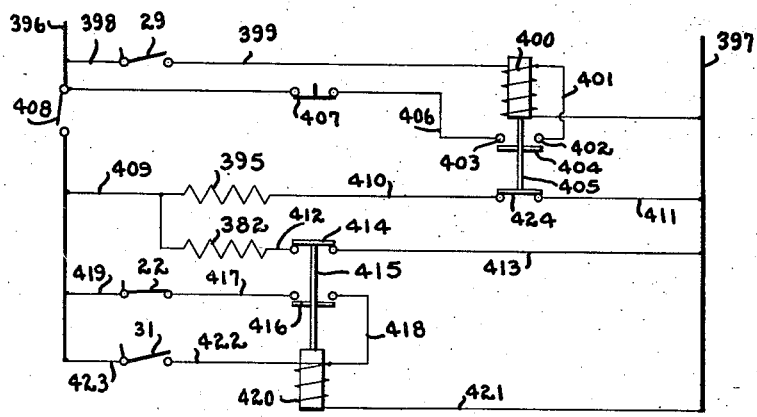
Figure 13 is an electric diagram for the device shown in Figure 12.

A simplified wiring diagram for Figure 12 is shown in Figure 13. According to this embodiment lines 396 and 397 constitute the main supply lines. The supply line 396 is connected with a line 398 which in its turn is connected with one terminal of the normally open high pressure tonnage control valve 29. The other terminal pertaining to the high pressure tonnage control valve 29 is connected by line 399 with one end of a solenoid 400, the other end of which is connected with the main supply line 397. The line 399 is at its junction point with the solenoid 400 also connected with a line 401 leading to a terminal 402 adapted to be connected with a terminal 403 by means of the switch blade 404 carried by the armature 405. The terminal 403 is connected with a line 406 comprising a normally closed emergency switch 407 and leading to one terminal of a starter switch 408 arranged in the main supply line 396.

Connected with the main supply line 396 is a line 409 which is connected with one end of the solenoid 395 and also with one end of the solenoid 382. The other end of the solenoid 395 is connected with a line 410 adapted to be connected with a line 411 leading to line 397 by means of a switch blade 424 carried by the armature 405. The other end of the solenoid 382 is connected with a line 412 adapted to be connected with a line 413 leading to line 397 by means of a switch blade 414 carried by the armature 415. The armature 415 also carries a switch blade 416 adapted to connect the lines 417 and 418 with each other. The line 417 is adapted to be connected with the line 419 leading to line 396 by means of the low pressure tonnage control valve 22. The line 418 is connected to one end of the solenoid 420 which cooperates with the armature 415 and the other end of which is connected by a line 421 with the main supply line 397. The line 418 is connected at its junction point with the solenoid 420 with a line 422 adapted to be connected by means of the platen operable switch 31 with the line 423 leading to the supply line 396.

Operation of third embodiment

In order to carry out the working stroke, the operator closes the switch 408 so that current flows from the supply line 396 through line 409, solenoid 395, line 410, blade 424, line 411 to the supply line 397. Simultaneously current flows through line 396, line 409, solenoid 382, line 412, switch blade 414 and line 413 to the supply line 397. In this way the solenoid 395 is energized with the result that the valve rod 391 is lifted so as to establish communication between the conduits 386 and 389, while energization of the solenoid 382 causes actuation of the shift rod 380 so as to move the pump 379 to full stroke delivery position. Pressure fluid is now supplied by the pump 379 through conduits 386 and 389 to the upper portion of the press cylinder bore 13 which fluid is supplemented by fluid from the tank 23 through the surge valve 24. The press piston 24 now carries out a quick downward movement by gravity. As soon as the press platen 15 approaches its normal work piece engaging position, the platen arm 30 closes the switch 31 thereby enabling current to flow from the line 396 through line 423, switch 31, line 422, solenoid 420, line 421 to the supply line 397. In this way the solenoid 420 is energized thereby causing a lifting movement of the blades 416 and 414 so that the blade 416 connects the line 418 with the line 417, thereby establishing a holding circuit for the solenoid 420, while a lifting movement of the switch blade 414 breaks the connection between the lines 413 and 417 so as to de-energize the solenoid 382. As soon as the solenoid 382 is de-energized, the spring 383 pulls the armature 381 over toward the left until it engages the stop 384. This movement of the armature 381 is conveyed through the shift rod 380 to the pump 379 so as to move the latter to a restricted delivery position. Consequently only a small quantity of fluid is delivered by the pump 379 to the upper portion of the press cylinder bore 13 with the result that the advance movement of the press piston 14 is materially slowed down. The press piston now continues its downward movement with the thus reduced speed until it encounters resistance offered by a work piece. If this occurs pressure builds up in the upper portion of the press cylinder 13 thereby closing the surge valve 24, and when a predetermined minimum pressure in the upper portion of the press cylinder 13 is obtained, the low pressure tonnage control valve 22 is actuated so as to break the connection between the lines 419 and 417, thereby breaking the holding circuit for the solenoid 420. As a result thereof the armature 415 returns to its previous position in which the switch 416 breaks the connection between lines 418 and 417, while the blade 414 effects communication between the lines 412 and 413. Consequently, current from the supply line 396 again flows to line 409 and from there, in the previously described manner, through the solenoid 382 so that energization thereof causes the pump 379 again to move to full stroke delivery position. The advance movement of the press platen is therefore again speeded up and the actual pressing operation is now effected. As soon as at the end of the pressing operation a predetermined high pressure is obtained, this pressure actuates the high pressure tonnage control valve 29 in such a manner as to cause the latter to establish connection between the lines 398 and 399. Current now flows from the supply line 396, through line 398, the high pressure tonnage control valve 29, line 399 and solenoid 400 to the supply line 397. In this way the solenoid 400 is energized which causes the armature 405 to move upwardly so that the blade 404 connects the terminals 402 and 403 with each other, while the blade 424 breaks the connection between the lines 410 and 411. The blade 404 thus establishes a holding circuit for the solenoid 400 which comprises the main supply line 396, normally closed emergency switch 407, line 406, blade 404, line 401, solenoid 400 and main supply line 397. Interruption of the connection between the lines 411 and 410, due to the lifting movement of the blade 424, causes de-energization of the solenoid 395 so that the spring 394 moves the valve rod 391 downwardly, thereby establishing connection between the conduits 386 and 390, while breaking connection between the conduits 386 and 389. Consequently pressure fluid is now delivered by the pump 379 through conduits 386 and 390 to the lower portion of the press cylinder bore 13, thereby effecting the retraction of the press piston 14. When the press platen approaches the end of its retraction stroke, the platen arm 30 engages the collar 392 so as to lift the valve rod 391, thereby shifting the four-way valve 387 to neutral position in which the delivery of the pump 379 is by-passed through line 388 to the tank 23. The press piston 14 thereby comes to a standstill, in which it remains until a new cycle is started.

If, due to leakage between the upper portion and the lower portion of the press cylinder 13, the press piston 14 should slightly move downwardly, the valve rod 391 with its collar 392 will, due to the spring 394, follow the platen arm 30, thereby again establishing connection between the conduit 386 and the conduit 390 so that the piston 14 is moved upwardly again until it has reached the end of its retraction stroke as previously described.

It is understood that we desire to comprehend within our invention such modifications as come within the scope of the claims.

Having thus fully described our invention what we claim as new and desire to secure by Letters Patent, is:

1. In a hydraulic press, a press cylinder, a press ram reciprocably mounted in said press cylinder, a fluid source adapted to supply pressure fluid to said press cylinder for actuating said ram, control means associated with said fluid source for varying the delivery of fluid thereof to said press cylinder and for changing the direction of flow of said fluid to said press cylinder, slow down means operable to actuate said control means for slowing down the movement of said ram prior to resistance being exerted upon said ram by a work piece to be pressed, and means responsive to a resistance exerted by a work piece upon said ram for actuating said control means so as again to speed up the advancing movement of said ram.

2. In a hydraulic press, a press cylinder, a press ram reciprocably mounted in said press cylinder, pumping means adapted to supply pressure fluid to said press cylinder for actuating said ram, control means associated with said pumping means for varying the delivery of fluid thereof to said press cylinder and for changing the direction of flow of said fluid to said press cylinder, means responsive to a predetermined position of said press ram for actuating said control means to slow down the advancing movement of said ram, and means responsive to a predetermined low pressure acting upon said press ram for actuating said control means so as to cause speeding up of the movement of said ram during the rest of its advancing stroke.

3. In a hydraulic press, a press cylinder, a press ram reciprocably mounted in said press cylinder, a fluid source adapted to supply pressure fluid to said press cylinder for actuating said press ram, control means associated with said fluid source for varying the delivery of said fluid source to said press cylinder and the direction of flow from said fluid source to said press cylinder, means operatively connected to said control means and responsive to a predetermined position of the ram for causing a reduction in the delivery of said fluid source to initiate a slow down action upon the press ram during its advancing stroke, and fluid means adapted in response to a predetermined pressure on said ram to actuate said control means for increasing the delivery of said fluid source, thereby causing said ram to again speed up after said slow down operation.

4. In a hydraulic press, a press cylinder, a press ram reciprocably mounted in said press cylinder, a variable delivery pump adapted to supply pressure fluid to said press cylinder for actuating said press ram, means for initially placing said pump into full delivery position, control means operatively connected with said variable delivery pump for restricting the pumping stroke thereof in response to a predetermined position of said press ram, and restoring means operatively connected with said pump and adapted, in response to a predetermined pressure in said press cylinder, to restore said pump to full delivery position.

5. In a hydraulic press, a press cylinder, a press ram reciprocably mounted in said press cylinder, a variable delivery pump adapted to supply pressure fluid to said press cylinder for actuating said press ram, means for initially putting said pump on full delivery stroke, control means operatively connected with said variable delivery pump and operable in response to a predetermined advancing movement of said press ram for restricting the delivery stroke of said variable delivery pump, and means operatively connected with said variable delivery pump and adapted, in response to a predetermined pressure in said press cylinder, to counteract the said fluid restricting means for causing said pump to resume its full delivery stroke.

6. In a hydraulic press, a press cylinder, a press ram reciprocably mounted in said press cylinder, a fluid source adapted to supply pressure fluid to said press cylinder for operating said press ram, means for initially placing said fluid source into increased delivery position, control means including pressure operable means operatively connected with said fluid source for restricting the delivery of said fluid source in response to a predetermined position of said ram, and means operatively connected with said pressure operable means for restoring the initial delivery of said fluid source in response to a predetermined resistance encountered by said press ram.

7. In a hydraulic press, a press cylinder, a press ram reciprocably mounted in said press cylinder, a reversible variable delivery pump adapted to supply pressure fluid to said press cylinder for actuating said press ram, means for initially placing said pump into full delivery forward stroke position, pressure supply means, a pressure operable cylinder-piston-assembly, valve means controlling the supply of pressure from said pressure supply means to said pressure operable cylinder-piston-assembly, means operatively connecting said pressure cylinder-piston-assembly and said variable delivery pump for varying the delivery of fluid and the direction of the flow of fluid of said pump, means responsive to a predetermined position of said press ram for controlling said valve means so as to cause said pressure cylinder-piston-assembly to shift said variable delivery pump to a restricted delivery position, and means responsive to a predetermined pressure in said press cylinder and adapted to operate said valve means so as to cause said cylinder-piston-assembly to restore said variable delivery pump to full delivery forward stroke position.

8. In a hydraulic press, a press cylinder, a press ram reciprocable in said press cylinder, a variable delivery pump for supplying pressure fluid to said press cylinder to actuate said press ram, pressure supply means independent of said pump, a cylinder-piston-assembly operable by pressure from said pressure supply means, means operatively connecting said cylinder-piston-assembly with said pump for varying the flow of fluid thereof, valve means interposed between said cylinder-piston-assembly and said pressure supply means for controlling the conveyance of pressure from the latter to said cylinder-piston-assembly, starter means for controlling said valve means to admit pressure from said pressure supply means to said cylinder-piston-assembly to cause the latter to move the pump to full delivery position, means responsive to the movement of said press ram and adapted to control said valve means so as to cause pressure from said pressure supply means to actuate said cylinder-piston-assembly for reducing the delivery stroke of said pump, and pressure responsive means operatively connected with said valve means and responsive to a predetermined pressure on said ram for conveying pressure from said pressure supply means to said cylinder-piston-assembly for causing the latter to restore said pump to full delivery position.

9. In a hydraulic press, a hydraulically operable press ram, a variable delivery pump for supplying pressure fluid to said press ram, an air pressure operable cylinder-piston-assembly connected with said pump for varying the flow of fluid thereof, air pressure supply means to supply compressed air to said cylinder-piston-assembly, means for causing compressed air from said air pressure supply means to actuate said cylinder-piston-assembly so as to put the pump on full delivery stroke, means responsive to the advancing movement of said press ram for controlling the supply of compressed air to said cylinder-piston-assembly so as to reduce the delivery stroke of said pump, means responsive to a predetermined low pressure in said press cylinder for controlling the supply of compressed air to said cylinder-piston-assembly so as to restore said pump to full delivery position, and means responsive to a predetermined high pressure in said press cylinder for reversing the direction of flow of pressure fluid from said pump to said press ram.

10. In a hydraulic press, a hydraulically operable press ram, a reversible variable delivery pump for supplying pressure fluid to said ram, means for initially putting said pump on an increased delivery stroke, pressure fluid supply means, a link including a differential cylinder-piston-assembly adapted to be supplied with pressure fluid from said pressure supply means, a linkage interconnecting said link with said pump for varying the delivery stroke thereof and the direction of the flow of fluid from said pump, a follower operatively connected with said linkage and adapted to effect a shifting movement of said pump to neutral position, a push rod adapted to engage said follower for actuating the same, means for allowing said follower to continuously engage said push rod, said push rod being operable in response to a predetermined position of said ram, slow down means operatively connected with said link for restricting the delivery stroke of said pump in response to a predetermined position of said ram, means responsive to a predetermined low pressure on said ram for causing said link to restore said increased delivery stroke of said pump for the rest of the advancing movement of said ram, and means responsive to a high pressure on said ram for causing said link to reverse the delivery of said pump.

11. A hydraulic press comprising in combination a hydraulically operable press ram, a one-way variable delivery pump for supplying pressure fluid to said ram, means for initially placing said pump into full stroke delivery position, valve means associated with said pump for varying the direction of flow of pressure fluid to said ram, means for reducing the delivery stroke of said pump in response to a predetermined position of said ram during its advancing stroke, and means responsive to a predetermined pressure on said ram for restoring said pump to its full delivery stroke for the rest of the advancing movement of said ram.

12. A hydraulic press comprising in combination a press ram, a one-way variable delivery pump for supplying pressure fluid to said ram, means for initially placing said pump into full stroke delivery position, valve means associated with said pump for varying the direction of flow of pressure fluid from said pump to said press ram, means responsive to a predetermined advancing position of said press ram for actuating electric means adapted to effect a reduction of the delivery stroke of said pump, and means responsive to a predetermined pressure on said press ram during its advancing stroke for actuating electric means causing said pump to return to full delivery position.

13. A hydraulic press comprising in combination a hydraulically operable press ram, a one-way variable delivery pump for supplying pressure fluid to said press ram, means for initially placing said pump into full stroke delivery position, valve means associated with said pump for controlling the direction of flow of pressure fluid to said ram, electric controlling means responsive to a predetermined position of said press ram for reducing the delivery stroke of said pump, means responsive to a predetermined low pressure on said ram during the advancing stroke thereof for restoring said pump to full delivery stroke position, and means responsive to a high pressure acting on said press ram at the end of its advancing stroke for causing said valve means to reverse the direction of flow of pressure fluid from said pump to said ram.

14. In a hydraulic press, a one-way variable delivery pump, means associated with said pump for urging said pump to neutral or no-delivery position, stop means for preventing said pump from reaching neutral or zero position, a hydraulically operable press ram adapted to be supplied with pressure fluid from said pump, means for initially placing said pump into full delivery position, means responsive to a predetermined position of said ram for reducing the delivery stroke of said pump, means responsive to a predetermined pressure on said ram for returning said pump to full delivery position, valve means adapted selectively to vary the direction of flow of pressure fluid from said pump to said ram or to by-pass the delivery of said pump to exhaust, means responsive to a pressure higher than said first mentioned pressure for actuating said valve means to reverse the direction of flow of pressure fluid from said pump to said ram, and means responsive to a predetermined position on the retraction stroke of said ram for causing said valve to by-pass the delivery of said pump to exhaust.

15. A hydraulic press comprising in combination a hydraulically operable press ram, a fluid source for providing pressure fluid to said ram, means associated with said fluid source for varying the delivery thereof, means for initially placing said fluid source into position for increased delivery, means for reducing the delivery of said fluid source in response to a predetermined position of said ram during its advancing stroke, and means responsive to a predetermined pressure on said ram for restoring said increased delivery of said fluid source for the rest of the advancing stroke of said ram.

16. In a hydraulic press, a reversible variable delivery pump, a press ram operable by pressure fluid from said pump, means associated with said pump for continuously urging the latter to neutral or no delivery position, electric means associated with said pump and adapted selectively to move said pump to full delivery forward or retraction stroke position, means responsive to the initiation of a working cycle for actuating said electric means so as to cause placement of said pump into full delivery forward stroke position, means responsive to a predetermined advancing position of said press ram for de-energizing said electric means to allow movement of said pump to a reduced delivery position, means for preventing said pump from moving to zero position during its advancing stroke, and means responsive to a predetermined pressure during the advancing stroke of said ram for returning said pump to full delivery forward stroke position.

17. In a hydraulic press, a press ram, a reversible variable delivery pump for supplying pressure fluid to said ram to actuate the same, yielding means for continuously urging said pump to zero or no-delivery position, electric means adapted to oppose said means for selectively moving said pump to full stroke forward or retraction position, means responsive to a predetermined position of said ram during its advancing stroke for de-energizing said electric means, to allow said yielding means to effect a reduction in the delivery of said pump, stop means operable during said delivery reducing operation by said yielding means for maintaining said pump in a reduced delivery position, and means responsive to a predetermined pressure on said ram during its advancing stroke for re-energizing said electric means to cause the pump to resume its full stroke forward position.

18. In a hydraulic press, a press ram, a reversible variable delivery pump for supplying pressure fluid to said press ram, means associated with said pump for continuously urging said pump toward neutral or no-delivery position, electric means adapted to cause movement of said pump to full delivery position, stop means operable to prevent movement of said pump from full stroke forward position to neutral position, means responsive to a predetermined position of the ram during its advancing stroke for de-energizing said electric means while operating said stop means to allow said pump to return to a restricted delivery forward position, and means responsive to a predetermined pressure on said ram during its advancing stroke for re-energizing said electric means to return said pump to full stroke forward delivery position.

19. In a hydraulic press, a press ram, a reversible variable delivery pump for supplying pressure fluid to said press ram, means associated with said pump for continuously urging said pump toward neutral or no-delivery position, electric means adapted to cause movement of said pump to full delivery position, stop means operable to prevent movement of said pump from full stroke forward position to neutral position, means responsive to a predetermined position of the ram during its advancing stroke for de-energizing said electric means while operating said stop means to allow said pump to return to a restricted delivery forward position, means responsive to a predetermined pressure at the end of the advancing stroke of said ram for withdrawing said stop means and causing said electric means to move said pump to full stroke retraction position, and means operative at a predetermined position on the retraction stroke of said ram for de-energizing said electric means to allow return of said pump to no delivery position.

20. In a hydraulic press, a press ram, a reversible variable delivery pump for supplying pressure fluid to said press ram, spring means associated with said pump for continuously urging the latter toward neutral or no-delivery position, shifting means operable to oppose said spring means selectively to move said pump to full stroke forward or full stroke retraction position, means response to a predetermined position of the ram during its advancing stroke to allow movement of said pump to a reduced forward stroke position, means responsive to a predetermined low pressure on said ram for actuating said shifting means to move said pump to full stroke forward position, and means responsive to a predetermined high pressure on said ram for actuating said shifting means so as to shift the pump from full stroke forward position to full stroke retraction position.

21. In a hydraulic press, a press ram, a reversible variable delivery pump for supplying pressure fluid to said ram, spring means on opposite sides of said pump adapted to move said pump to neutral or no-delivery position, first electric means operable to shift said pump to full stroke forward position, second electric means operable to shift said pump to full stroke retraction position, stop means operable to maintain said pump on a reduced forward stroke, starter means for energizing said first electric means to move said pump to full stroke forward position, switch means responsive to a predetermined position of said ram to de-energize said first electric means and to make said stop means effective, means responsive to a predetermined pressure acting on said press ram for re-energizing said first electric means, means adapted to de-energize said first electric means and energize said second electric means at the end of the advancing stroke of said ram, and means for making said stop means ineffective during the energization of said second electric means.

22. In a hydraulic press, a press ram, a reversible variable delivery pump for supplying pressure fluid to said ram, spring means on opposite sides of said pump adapted to move said pump to neutral or no-delivery position, first electric means operable to shift said pump to full stroke forward position, second electric means operable to shift said pump to full stroke retraction position, stop means operable to maintain said pump on a reduced forward stroke, starter means for energizing said first electric means to move said pump to full stroke forward position, switch means responsive to a predetermined position of said ram to de-energize said first electric means and to allow said stop means to maintain said pump on said reduced forward stroke, means responsive to a predetermined pressure acting on said press ram for re-energizing said first electric means, means responsive to a pressure higher than the last mentioned pressure acting on said ram at the end of its advancing stroke for de-energizing said first electric means and energizing said second electric means, means operable concomitantly with the energization of said second electric means for withdrawing said stop means from its stopping position, and means responsive to a predetermined position on the retraction stroke of said ram for de-energizing said second electric means to allow said pump to return to neutral position.

WALTER ERNST.
PHILIP J. LINDNER.